US012063939B2

(12) United States Patent
Dyer (10) Patent No.: US 12,063,939 B2
(45) Date of Patent: Aug. 20, 2024

(54) SYSTEMS AND METHODS FOR FOWL KEEL REMOVAL (71) Applicant: Harrison Poultry, Inc., Bethlehem, GA (US)

(72) Inventor: Jerry Dyer, Braselton, GA (US)

(73) Assignee: Harrison Poultry, Inc., Bethlehem, GA (US)

( * ) Notice: Subject to any disclaimer, the term of this patent is extended or adjusted under 35 U.S.C. 154(b) by 52 days.

(21) Appl. No.: 18/158,671

(22) Filed: Jan. 24, 2023

(65) Prior Publication Data
US 2024/0245064 A1 Jul. 25, 2024

(51) Int. Cl.
*A22C 21/00* (2006.01)
(52) U.S. Cl.
CPC .................. *A22C 21/0069* (2013.01)
(58) Field of Classification Search
CPC ............ A22C 21/0069; A22C 21/0023; A22C 21/003; A22C 21/0038
USPC .......................................... 452/135
See application file for complete search history.

(56) References Cited

U.S. PATENT DOCUMENTS

| 5,562,532 | A | * | 10/1996 | Horst | A22C 21/0023 452/136 |
| 5,697,837 | A | * | 12/1997 | Verrijp | A22C 21/003 452/136 |
| 6,283,847 | B1 | | 9/2001 | Berry et al. | |
| 8,845,401 | B2 | | 9/2014 | De Vos et al. | |
| 8,974,271 | B2 | * | 3/2015 | De Vos | A22C 21/003 452/136 |
| 11,172,687 | B2 | | 11/2021 | Gasbarro | |
| 2010/0081366 | A1 | | 4/2010 | De Vos et al. | |
| 2015/0272142 | A1 | | 10/2015 | Slagboom et al. | |
| 2022/0079175 | A1 | * | 3/2022 | Nolten | A22C 21/0053 |

\* cited by examiner

*Primary Examiner* — Richard T Price, Jr.
(74) *Attorney, Agent, or Firm* — Maier & Maier, PLLC (57) ABSTRACT Systems and methods for de-keeling poultry are provided. The system includes a trap module with an assembly roof, an assembly wall that extends downwards from the assembly roof, and a trap door, where the trap door is attached to the assembly roof and extends downwards parallel to the assembly wall. The system further includes a blade module with a vertical blade mount, one or more blades attached to the vertical blade mount, and one or more movement systems, the trap module and the blade module are each attached to one of the one or more movement systems and are move horizontally along the one or more movement systems.

20 Claims, 9 Drawing Sheets

```
┌─────────────────────────────────────────────────┐
│ Nick the top of the keel about 2/3 of the way through │
│         the keel downward with a blade          │
│                       702                       │
└─────────────────────────────────────────────────┘
                        │
                        ▼
┌─────────────────────────────────────────────────┐
│ Introduce a shaped positioning "die" shape over the │
│                       keel                      │
│                       704                       │
└─────────────────────────────────────────────────┘
                        │
                        ▼
┌─────────────────────────────────────────────────┐
│  Push upward through the cone with a rotating or │
│       straight die in spiked or other shape     │
│                       706                       │
└─────────────────────────────────────────────────┘
                        │
                        ▼
┌─────────────────────────────────────────────────┐
│ Optionally introduce a blade under the front edge of the │
│    cone to sever remaining membranes or pieces  │
│                       708                       │
└─────────────────────────────────────────────────┘
```

Fig. 7

SYSTEMS AND METHODS FOR FOWL KEEL REMOVAL

BACKGROUND

Fowl have a keel bone which extends radially along the breastbone, perpendicular to the ribcage. The keel resembles an inverted "Y" and from the top view looks like and arrowhead, with the larger end (near the neck of the bird) being connected to the breastbone via a strong and elastic membrane. In contrast to the off-red breastbone and tender meat below it, the keel is generally an off-white color. Poultry keels have value in pharmaceuticals, cosmetics, and the food industry. The keel is comprised of cartilage, and is approximately 25% collagen, and attaches to the poultry's sternum. In order to harvest the keel from the poultry, or generally to harvest the breast meat of the poultry, the keel must be separated from the sternum.

General deboning machines are composed of conveying mechanisms with cones (or mandrels), to remove the wings, breast meat, and tenders of poultry, leaving behind a deboned carcass ("frame"). Some of these machines do not have provisions to remove the keel, and therefore removing the keel has been a secondary process in processing plants, which is both manpower and time intensive. Some machines may be able to remove the keel, but they are either inefficient or inaccurate, removing portions of meat or other debris along with the keel or leaving portions of the keel behind.

SUMMARY

According to one or more exemplary embodiments systems and methods for fowl keel removal may be provided. A first exemplary embodiment may provide a grip-and-twist system and method for removing fowl keels. The grip-and-twist system may include an assembly with jaws, which are preferably misaligned to tilt the keel, and an attached blade to fully or partially cut the keel. During operation, the jaws and blade may "nick" or cut, and grip a fowl keel and twist or rotate the keel to separate from any remaining portion of the keel and the membrane, the assembly may side-shift or rotate to remove the keel from the carcass, and the jaws open to discharge the keel into a conveyor, containment vessel and/or area.

A second exemplary embodiment may provide a trap-and-blade system and method for removing fowl keels. The trap-and-blade system may include a trap module and a blade module. The blade module may include one or more blades, and the trap module may include a pivotable trap door and a side slot for a blade to pass through. The trap and blade modules may be movable, and/or on an alignment track or rail, and may be able to move along the track or rail to retract and extend. In a method the trap module may extend over a cone with a fowl carcass and keel, then the blade module may extend, severing the keel. The trap module may then retract, while the blade remains in position acting as a base for the keel to "ride" as it is contained in the trap until it falls from the edge of the blade, dropping it into a conveyor, containment vessel and/or area.

A third exemplary embodiment may provide a "punch-and-die" system and method for removing fowl keels. The "punch-and-die" system may include one or more blades, a shaped die, such as a U, rectangle, or otherwise "hold-down" support for the sides of the keel, and a spinning or straight spike or punch. In a method the fowl keel may be nicked near the top of the keel. The shaped die may then be introduced over and/or against the keel, and a rotating or straight spike shaped punch may be pushed upwards through the cone the fowl carcass is on. In an optional embodiment one or more blades may be used to sever remaining membrane pieces.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

As used herein, a chicken or fowl "carcass" is what is left of a chicken or fowl after the chicken or fowl has been passed through a deboning machine. Specifically, the "carcass" has had its breast filets, wings, tenders, skin, etc. already removed.

As used herein, a "cone" refers to a structure on which fowl can be mounted on and processed by other machinery. The cone may be stationary, indexed to intermittently run and stop, or may move continuously or be indexed through an assembly line type structure through, for example, a conveying device, in order to be processed by various machines or modules.

As used herein, "de-keeler", "keel-cutter", and "keel removal system" may be understood to be synonymous.

In one or more exemplary embodiments a system for removing the keel from a chicken or other fowl may be a stand-alone unit that intakes a fowl carcass on a cone or other structure and outputs a de-keeled carcass and a removed keel. In some embodiments the system may be implemented into or after an existing deboning assembly line or machine, for example by mounting on or near the existing structure. In an assembly line structure, it may be understood that fowl may continuously pass through each portion of the structure, including the keel removal portion, on a cone and at a constant rate, for example 50 per minute or slightly less than 1 per second. The cones may move through on a conveying device or on moving structures to support the moving cones. In an alternative embodiment the system may be an "indexing" type system where the cone moves through an assembly line structure and is operated on by various modules or machines. Non-indexing deboners may have timed modules to move tools to match the speed of the conveying device. It may be understood that the de-keeler may be compatible with any deboner, whether indexing, moving, automated, or manual.

In one or more exemplary embodiments a control operations system and method may be provided. The control operations system may include a programmable controller. In an exemplary embodiment the programmable controller may perform various checks on the de-keeler before allowing operation. Such checks may include, but are not limited to, making sure the assembly main power is correctly linked to the de-keeler, making sure the safety enclosure around the assembly and/or de-keeler is correctly closed and linked to the safety switches on the safety doors, making sure the carcass is aligned, and, wings, breast, tender meat, etc are not present on the carcasses going to the de-keeler, making sure cone location is correct, and/or making sure the cone stops at the correct location for the de-keeler or other operations to be performed. The programmable controller may further be connected with various cameras or sensors, for example a line-scan camera, laser measure or position sensor, and/or may utilize computer vision in order to assist in the above operations and/or to detect obstructions in the disassembly line structure or on the fowl carcass that would prevent or hinder operation of the de-keeler.

In other embodiments the cutting blade location of the blade which positions the cuts on the keel from the carcass, may be set through, for example, manually set adjustment bolts, line-scan cameras or sensors, a color detecting camera able to locate the exact point on the keel to be cut by detecting color differences between colored cones and the keel, LIDAR, computer vision, and/or a reset mechanism for each cone or set of cones. Carcasses may be highly variable in length and keel size. Using these detection devices may optimize the size of the keels by automatically checking the location of the keel, and, repositioning the nicking blade position, before cutting. Alignment of the de-keeling assembly, or portions of the assembly, may be set with adjustment bolts, and/or may use motors or actuators to move the location of the movement mechanism, for example in order to check the keel location on the cone, or to accommodate for deboning machine adjustments, or counteract wear over time.

A first exemplary embodiment may provide a "grip-and-twist" method of removing the keel, and a system to perform said method.

Figure 1:
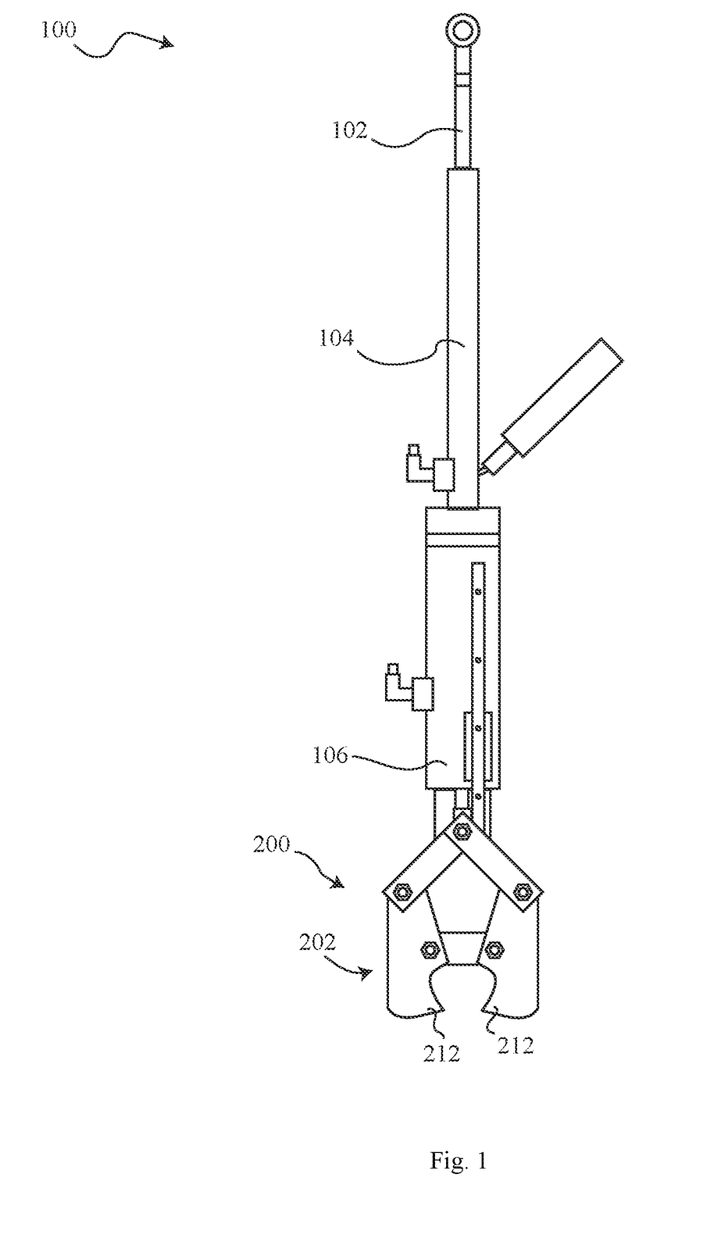
FIG. 1 shows an exemplary linear rotary actuator for performing grip-and-twist keel removal.

Referring to exemplary FIG. 1, an exemplary linear rotary actuator 100 for performing grip-and-twist keel removal may be shown. The linear rotary actuator 100 may have a linear motor portion 102 and a rotary motor portion 104. The linear rotary actuator 100 may further have an assembly placement area 106, which may, for example, house a gripper-blade assembly for use in removing poultry keels.

Figure 2A:
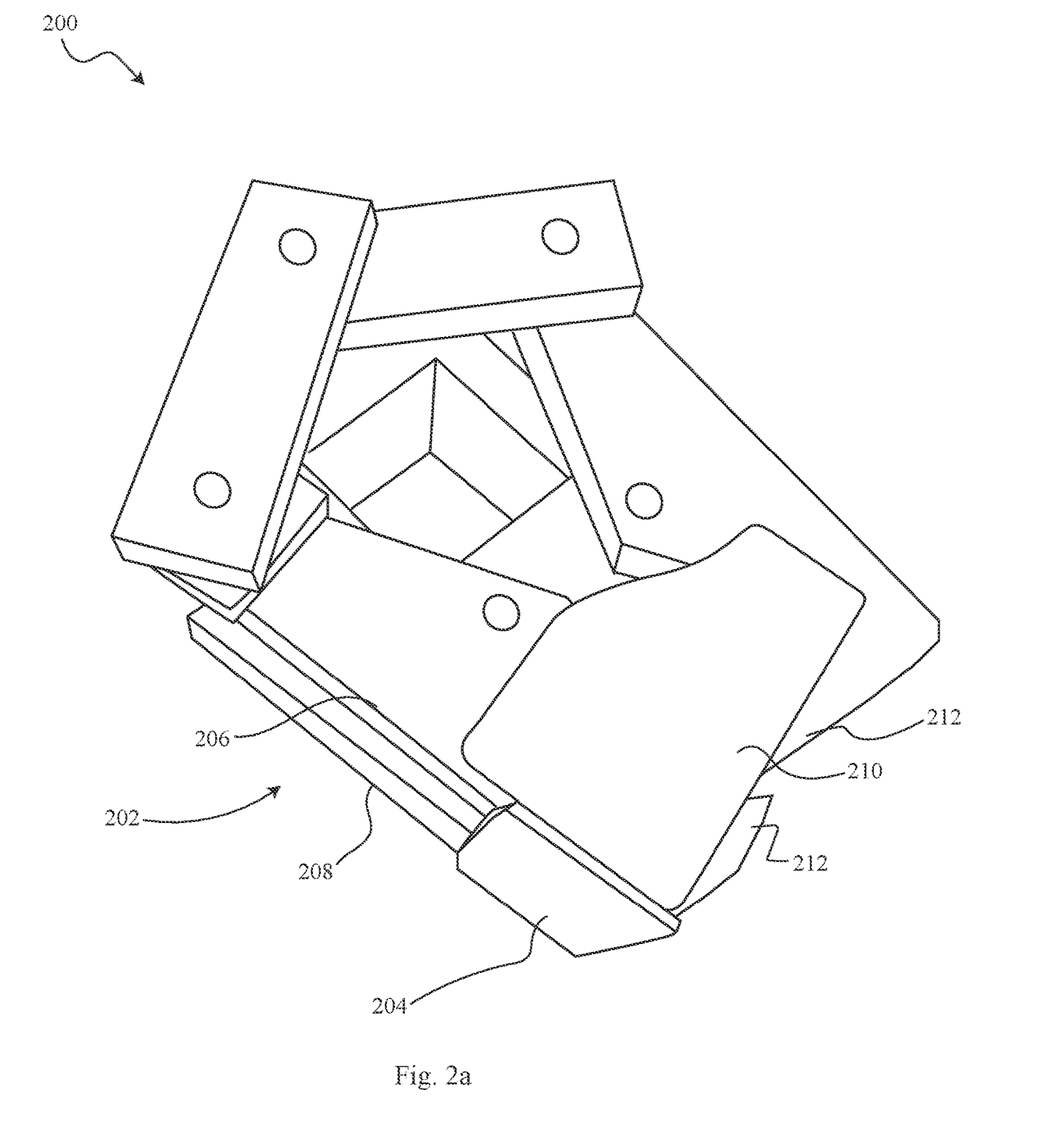
FIG. 2A shows a first view of an exemplary gripper-blade assembly.

Referring now to exemplary FIG. 2a, a first view of an exemplary gripper-blade assembly 200 may be shown. The gripper-blade assembly 200 may include a gripper-blade assembly head 202, which may be made of, for example, plastic, metal, a polymer mixture, etc. The gripper blade assembly 200 may further include a side blade 204 that is attached to the gripper-blade assembly head 202, the side blade 204 may be attached by, for example, being bolted, machined into, adhered through an adhesive, welded, etc. In different exemplary embodiments the side blade 204 may be stationary or rotary and may be attached to the side of assembly head 202, or on a separate mount beside the cone to sever the keel from the membrane, skin or protein media or any other protein, skin or meat. In an exemplary embodiment the side blade 204 may be attached to a first side 206 of the assembly head 202 and may extend out past a second side 208 of the assembly head 202, which may be perpendicular to the first side 206. The side blade 204 may be sharpened on the edge which is aimed at the membrane under the keel, so, that it is severed as the gripper moves away from the cone to the side or is rotated. The gripper-blade assembly 200 may further include a notch blade 210 that is attached to the second side 208 of the assembly head 202. In some embodiments the notch blade 210 may extend past the side blade 204. The notch blade 210 may be attached to the assembly head 202 by, for example, being bolted, machined into, adhered through an adhesive, welded, etc. The second side 210 of the assembly head 202 may be adjacent or perpendicular to the first side of the assembly head 202, and the notch blade 210 may extend out from the second side such that it is perpendicular to the side blade 204. In an exemplary embodiment the notch blade 210 may be right above the side blade 204, in other embodiments the relative position of the notch blade 210 and the side blade 204 may be different. In an exemplary embodiment the notch blade 210 may be connected to a motor or actuator which may actuate the notch blade 210 to extend and retract.

Figure 2B:
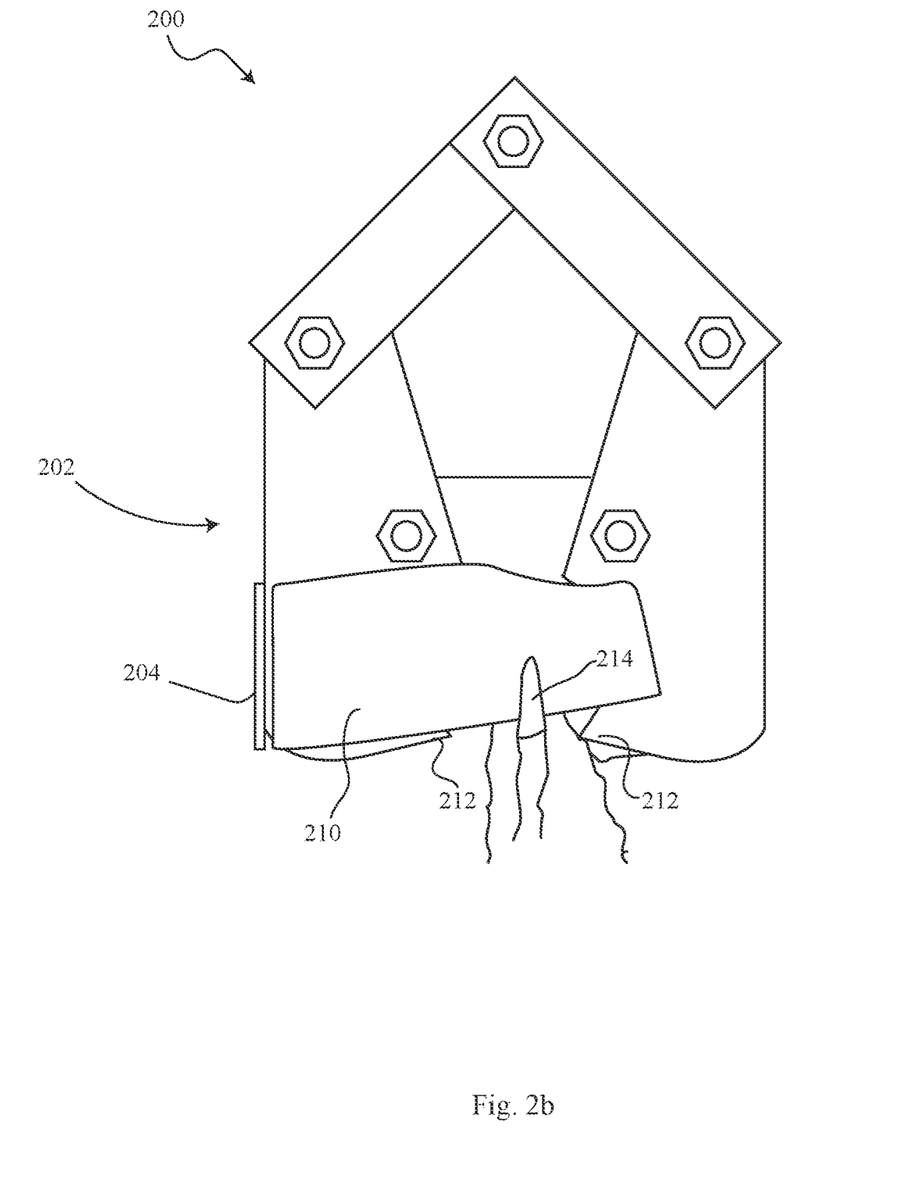
FIG. 2B shows a second view of an exemplary gripper-blade assembly.

Referring now to exemplary FIG. 2b, an additional view of an exemplary gripper-blade assembly 200 may be shown. The gripper-blade assembly 200 may further have gripper jaws 212. The jaws 212 may be attached to the bottom of the assembly head 202. In an exemplary embodiment the jaws 212 may be the same material, a different material, or a combination of same and different as the assembly head 202, in other embodiments the jaws 212 may be a separate construction that is attached to the bottom of the assembly head 202, for example the assembly head 202 may be metal and the jaws 212 may be plastic and may be attached via an adhesive or through bolts. The grip shape and size of the jaws 212 may be specially designed to grip or grasp around a poultry keel 214. The edges of the jaws 212 may be offset, which may allow the jaws 212 to rotate the keel 214, and enable more effective gripping, or cutting, thus allowing easier separation from the membrane under the keel 214. The jaw 212 shape may provide a wider middle section to allow for the rotation, and, an angled surface above to prevent the keel from escaping when the jaws 212 close. The jaw 212 may be connected to an actuator or motor that causes the jaw 212 to open or close, either automatically or with a specific input from a user, and may be connected to a gripper mechanism. The gripper-blade assembly 200 may further include a control module that can control the extension and retraction of the jaw 212 and side blade 204, and may control other movement of the system, for example twisting the jaw 212, either based on user commands, automatically as part of a larger system, or after being triggered by sensors or cameras.

Figure 3:
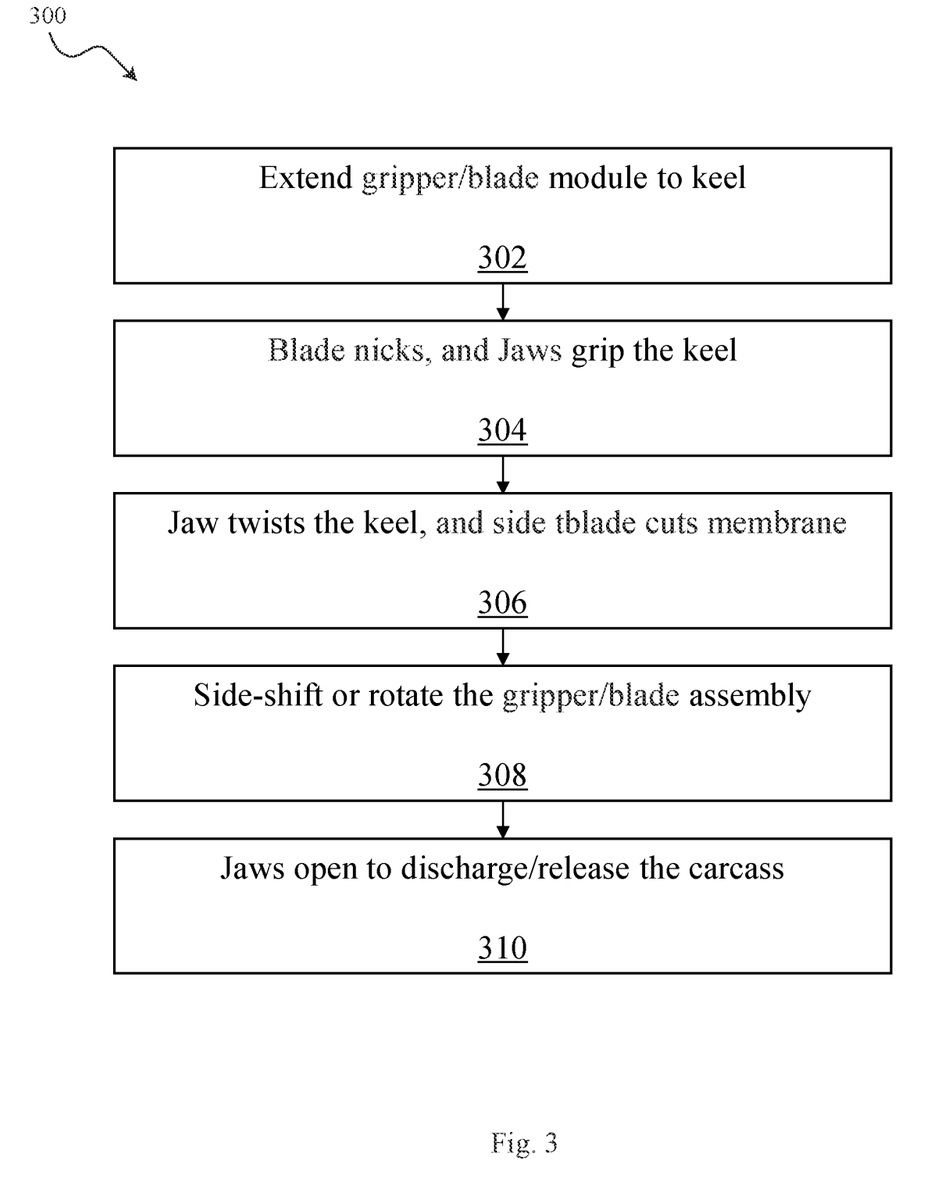
FIG. 3 shows an exemplary method for performing grip-and-twist removal of a poultry keel.

Referring now to FIG. 3, an exemplary method for performing grip-and-twist removal of a poultry keel 300 may be provided. In a first step 302 the gripper jaws 212, the notch blade 210, and the side blade 204 may be extended by the control module. The notch blade 210 may cut partially or fully through the keel 214 in its path which may result in the gripper jaws 212 stopping on either side of the keel 214. In a second step 304 the control module may close the jaws 212 so that they grip the poultry keel 214. In a third step 306 the jaw 212 may be twisted. In an exemplary embodiment the rotation may be 360 degrees, so the jaws 212 reset to their original orientation. In other embodiments the rotation may be more or less. The twisting motion may finish removing the nicked keel 214 from the membrane. The side blade 204 may be set to finish cutting any remaining membrane to allow the keel 214 to be harvested. In a fourth step 308 the entire gripper-blade assembly 200 may be side-shifted or rotated in order to fully remove the keel 214. For example, the gripper-blade assembly 200 may be attached to the end of a rotary linear actuator which pivots to one side, or which can rotate from an off-center position to change the keel-releasing position for the entire actuator-gripper assembly. In a final step 310 the jaws 212 may be opened, thereby discarding the keel 214 and releasing the carcass. In some embodiments the discarded keel 214 may be dropped directly from the jaws into a bin, conveyor, or collection area that may, for example, be beside the de-keeling machine.

A second exemplary embodiment may provide a "trap-and-blade" method of removing the keel, and a system to perform said method.

Figure 4A:
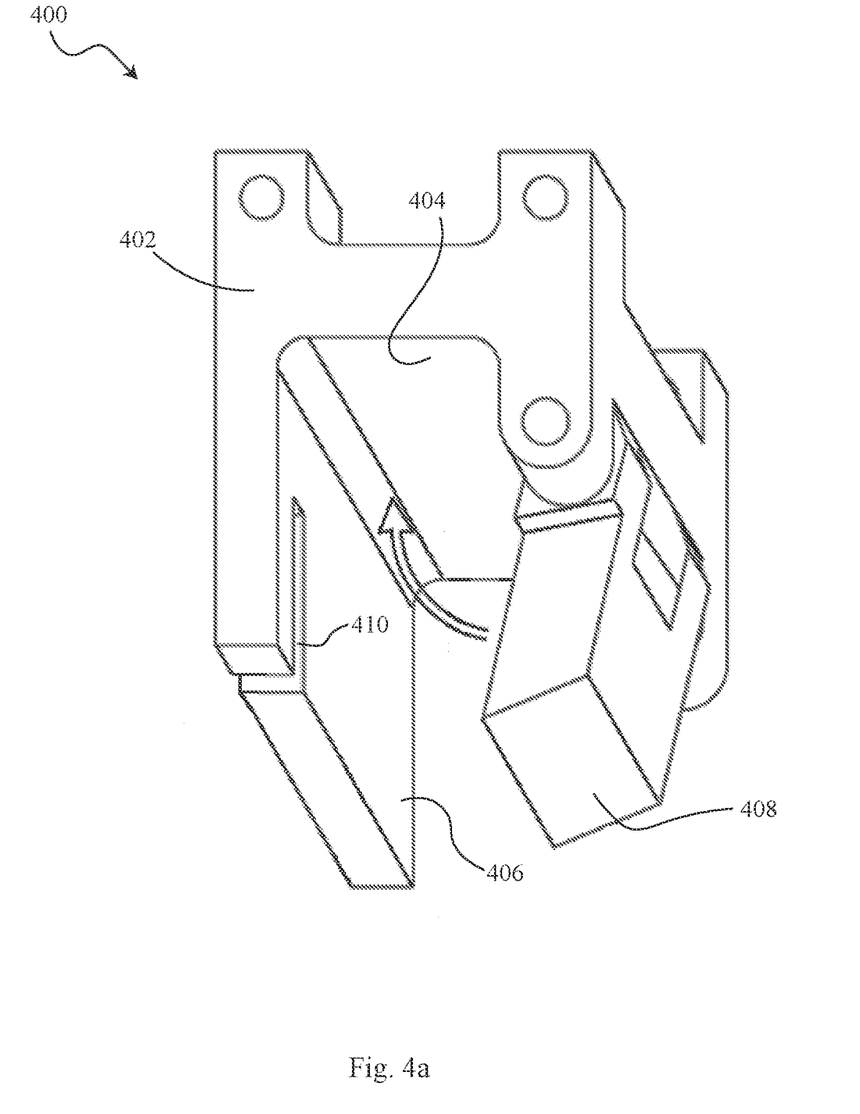
FIG. 4A shows an exemplary embodiment of a trap-and-blade poultry keel removal trap module.

Referring now to FIG. 4a, an exemplary trap-and-blade assembly trap module 400 may be shown. The trap-and-blade assembly may have an assembly base 402. The assembly base 402 may be made of, for example, plastic, metal, a polymer mixture, etc. The assembly base 402 may have an assembly roof 404. The assembly base 402 may further have an assembly wall 406 that extends down past the assembly roof 404. The assembly wall 406 may be a single construction with the assembly base 402 and the assembly roof 404, or may be a separate piece that is attached via, for example, bolts, adhesives, welding, etc. The trap module 400 may further include a trap door 408, which may be attached the assembly roof 404 on the opposite side as the assembly wall 406. The trap door 408 may be the same or a different material as the assembly roof 404 and/or assembly wall 406. The trap door 408 may be able to open and close, for example by being mounted on a hinge and attached to a motor or actuator, or in an embodiment it may move freely on a hinge but only in one direction (for example move freely inwards but not outwards). When the trap door 408 is closed it may reduce the distance between the trap door 408 and assembly wall 406 such that an object may be "trapped" in between the trap door 408 and the assembly roof 404. The shape and clearance of the trap door 408 may allow the trap door 408 to move freely across the top of the keel as it travels but drop on the other side of the keel by gravity, springs, actuator or other mechanism. The shape of the trap door 408 may rest against a shape in the roof to prevent swinging freely, or may be kept from swinging by guides, stops, or other locking devices. The assembly wall 406 may further have a blade slot 410, which may be, for example, an indentation or slit in the assembly wall 406 that can accommodate one or more blades being slid into the blade slot 410 to allow a vertical blade 454 to cut the keel.

Figure 4B:
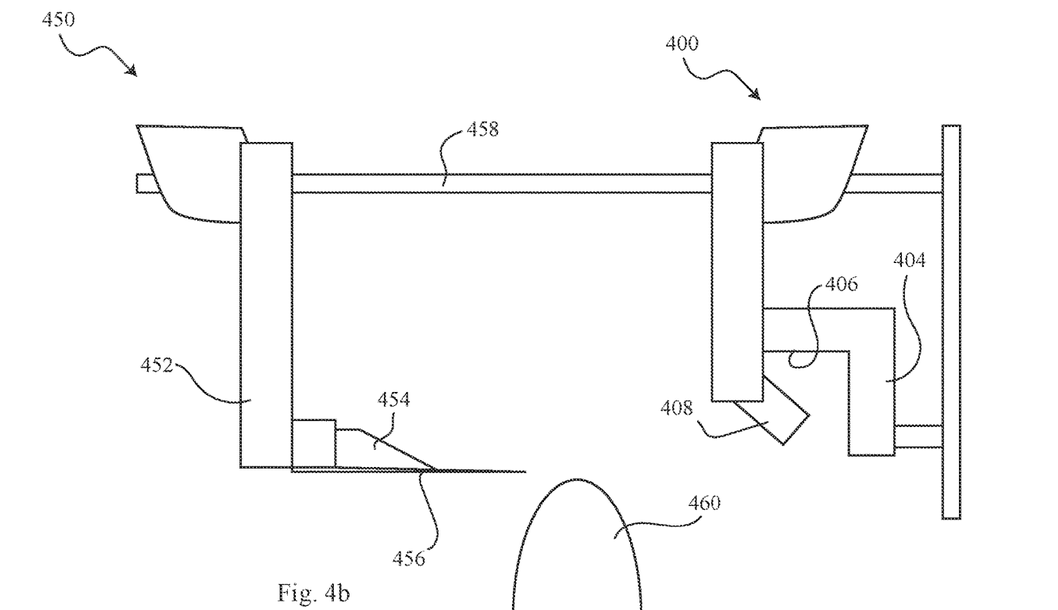
FIG. 4B shows an exemplary embodiment of a trap-and-blade poultry keel removal extended blade module.

Referring now to FIG. 4b, the "trap-and-blade" method of removing the keel from poultry may further include a blade module 450. The blade module 450 may include a vertical and/or horizontal blade mount 452, which may be made of, for example, plastic, metal, a polymer mixture, etc. One or more blades may be attached to the vertical and/or horizontal blade mount 452, they may be attached by, for example, being bolted, welded, or adhered. In an exemplary embodiment there may be two blades, for example the smaller vertical or near vertical blade 454, and a larger horizontally oriented bottom blade 456. In other embodiments more or fewer blades may be used, and the relative orientation of the blade(s) may differ. The blade module 450 and/or the trap module 400 may further be connected to a movement system 458. The movement system 458 may be, for example, a rail or track system. The blade module 450 and the trap module 400 may be attached to the same movement system 458 or may be attached to separate movement systems 458. The blade module 450 and the trap module 400 may be able to move horizontally by moving along the movement system 458, either manually or automatically by, for example, a motor such as a step motor, or actuator. In some embodiments the blade module 450 and the trap module 400 may be able to move vertically and/or rotate in order to be better positioned relative to a cone 460, on which there may be a fowl with the fowl keel.

Figure 4C:
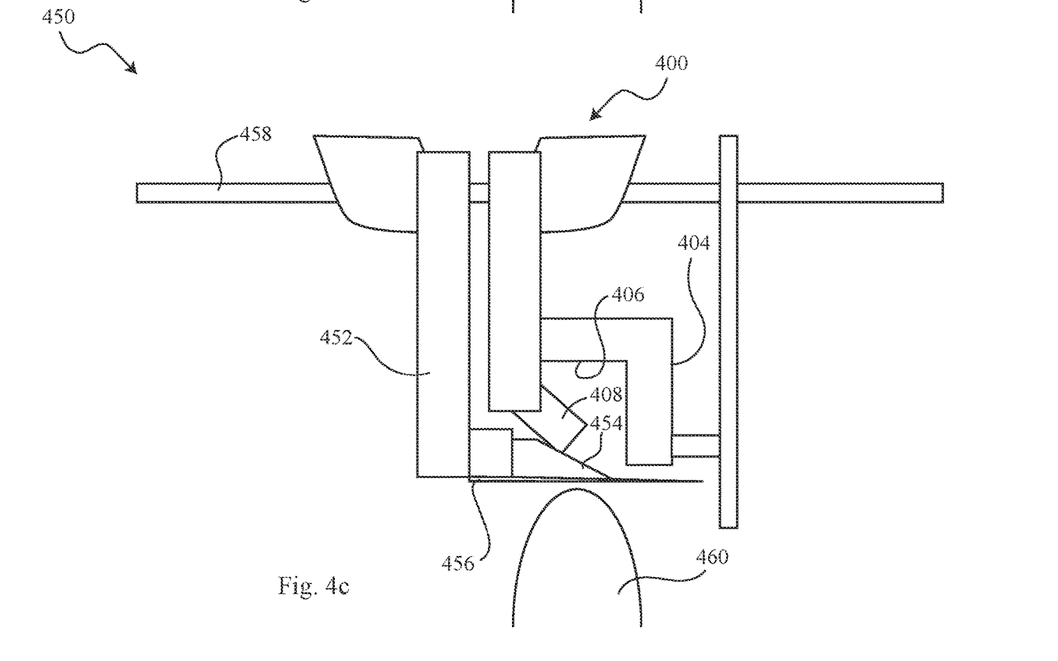
FIG. 4C shows an exemplary embodiment of a trap-and-blade poultry keel removal retracted blade module.

Referring now to FIG. 4c, when the blade assembly and trap assembly are fully extended an extended module may be shown. In the extended module the vertical blade 454 may align with the blade slot 410. The extension of the system may allow the large blade 456 and the vertical blade 454 to sever a poultry keel that is being held by the extended trap door 408.

Figure 5:
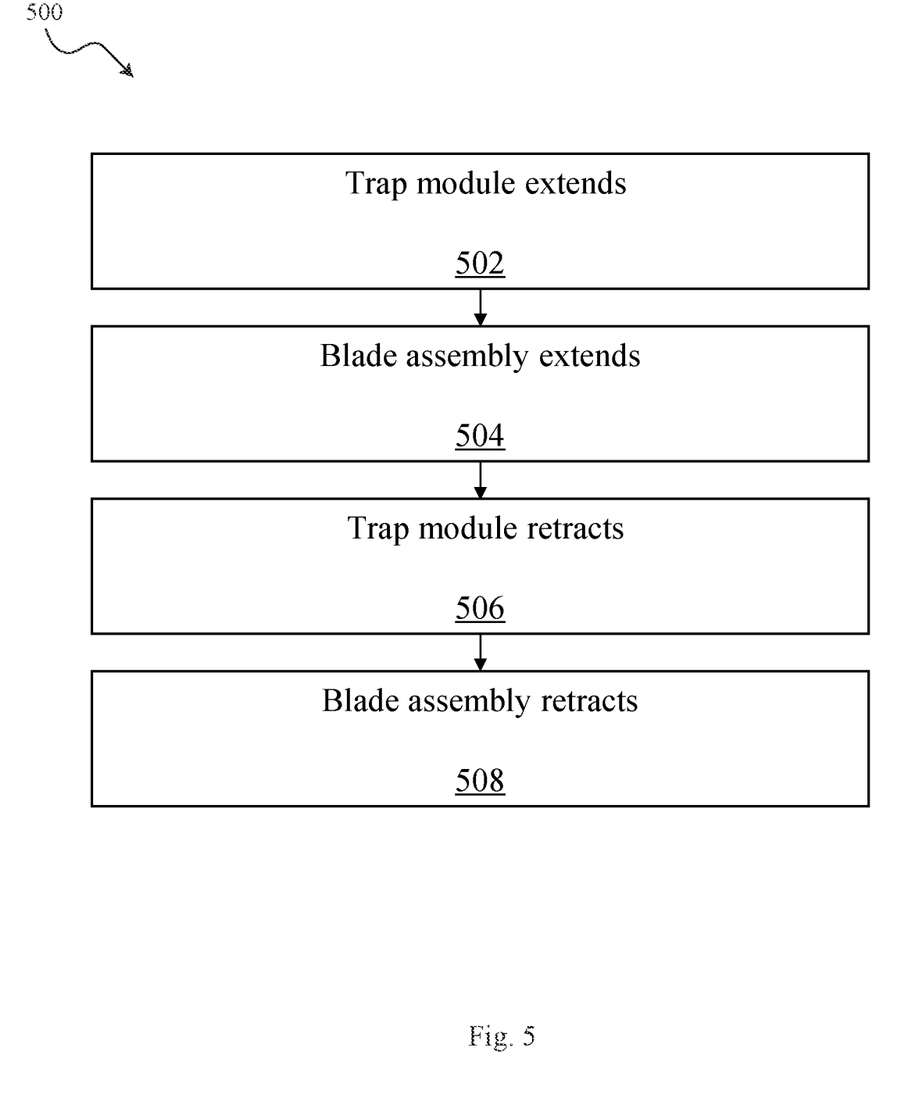
FIG. 5 shows an exemplary method for performing trap-and-blade removal of a poultry keel.

Referring now to FIG. 5, an exemplary method for performing trap-and-blade removal of a poultry keel 500 may be provided. In a first step 502 the trap module 400 may extend to a waiting poultry carcass, and the trap door 408 may freely ride over the keel. The assembly wall 406 may preferably bump the keel, which may tilt the keel so the blade module 450 can more easily access and slice between the keel and the cone 460. In a second step 504 the blade module 450 may extend by moving along the track or rail to the cone 460 with a fowl carcass. When the blade module 450 extends the large blade 456 and near vertical blade 454 may travel under and beside the keel, slicing it away from the fowl frame underneath while the keel is trapped in the trap module 400. This may result in the keel being cutaway and sitting on the large blade 456. In a third step 506 the trap module 400 may retract, the keel sitting inside the trap may be pulled across the large blade 456 by the retracting trap module 400, and may be dropped off the edge into, for example, a container, conveyor system, or other movement mechanism. In a final step 508 the blade module 450 may retract, thereby resetting the system and allowing for the process to continue one a new carcass is put in place.

A third exemplary embodiment may provide a "punch and die" method of removing the keel, and a system to perform said method.

Figure 6:
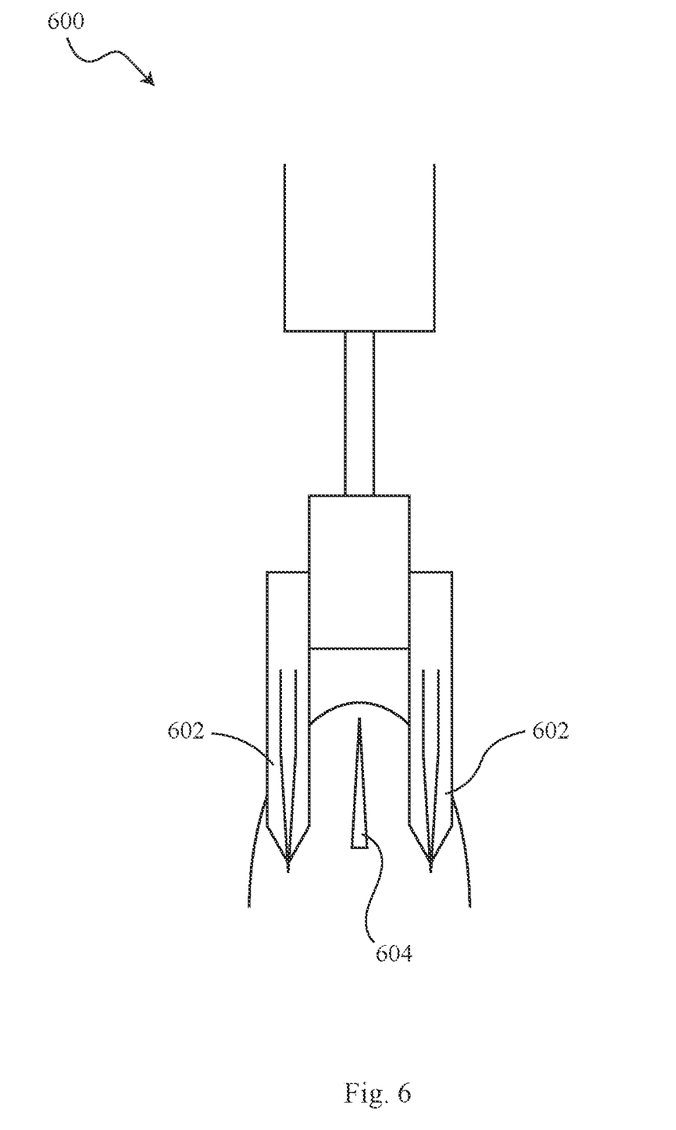
FIG. 6 shows an exemplary embodiment of a punch and die poultry keel removal assembly head.

Referring now to FIG. 6, a "punch and die" poultry keel removal assembly head 600 may be shown. The punch and die assembly head 600 may include one or more blades, a shaped block 602, and a spinning or straight spike 604. The spinning or straight spike 604 may be configured to be pushed up through a cone carrying the fowl carcass with a keel. The cone may be specially constructed in order to accommodate the spike 604. In an exemplary embodiment the shaped die 602 may be, for example, a U-shape block, which may allow the shaped die 602 to hold down the fowl carcass while the spike 604 removes the keel. In other embodiments the shaped die 602 may be a different shape, for example a rectangle or square.

Figure 7:
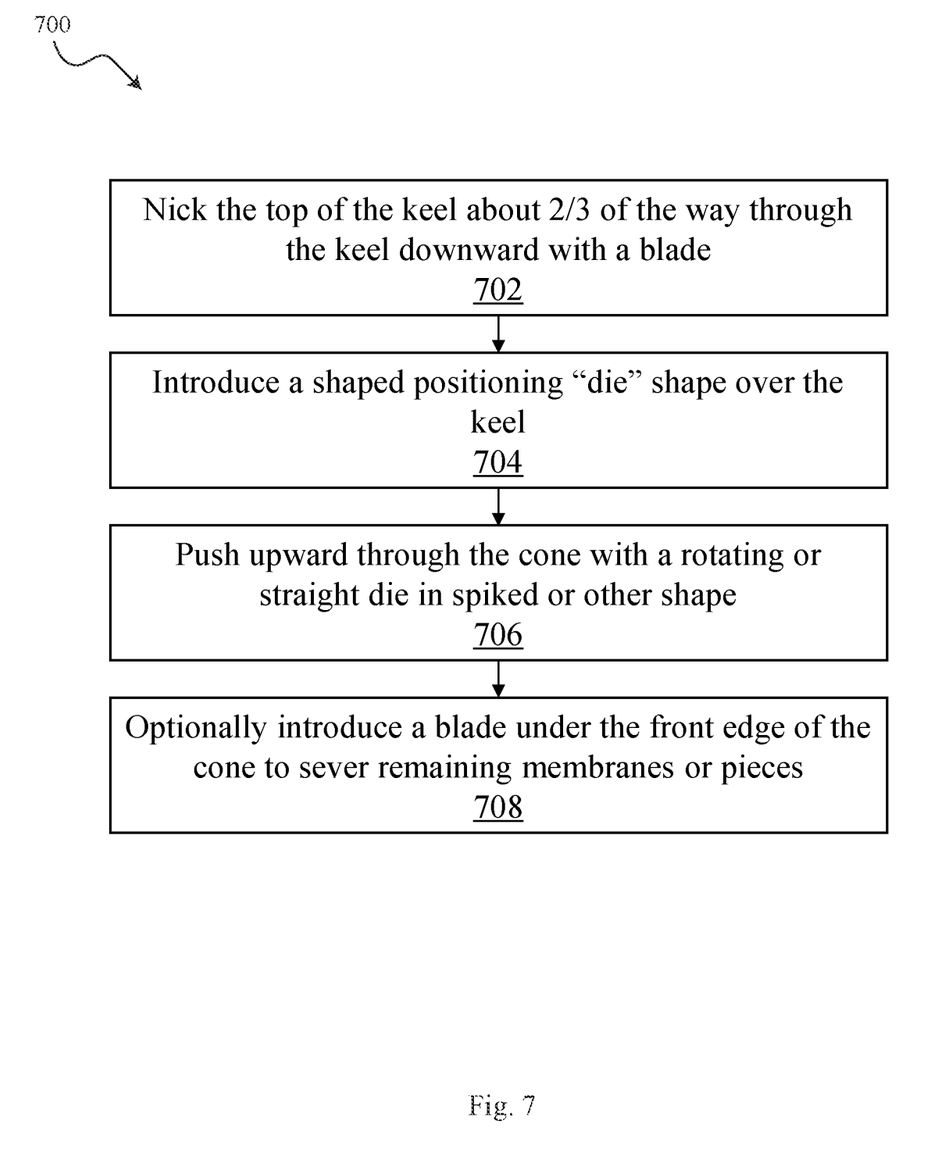
FIG. 7 shows an exemplary method for performing punch and die removal of a poultry keel.

Referring now to FIG. 7, an exemplary meth for performing the punch-and-die removal of a poultry keel 700 may be provided. In a first step 702 the top of the poultry keel may be nicked towards the top, for example about ⅔ of the way down, with a blade. The nicking may be done manually or may be done automatically by a blade module or other machine. In a second step 704 a block hold-down feature 602 may be placed over the keel. In an exemplary embodiment the block may be U-shaped in order to keep the carcass stable without putting pressure on the keel. In a third step 706 the rotating or straight spike 604 may be push upward through the cone, either manually or automatically using a motor, server, or actuator, pushing the keel and separating it from the rest of the carcass. In an exemplary embodiment a specially designed cone with space specifically for the spike 604 may be used. In an optional fourth step 708 another blade may be used under the front edge of the cone in order to sever any remaining membrane or muscle pieces still attached to the keel. The second blade may be a manual blade, or the cutting may be done automatically by a blade module or other machine or a blade attached to the punch and die assembly head 600.

In one or more exemplary embodiments the de-keeling system may use cameras and/or sensors in order to detect when the cone and fowl carcass are in position for de-keeling operation. Furthermore, the system may use cameras or sensors to detect the location and/or size of the fowl carcass and keel and may adjust the position of the de-keeling apparatus with, for example, an actuator or motor in order to optimize operation. In an exemplary embodiment it may be contemplated that the cones the carcass are mounted on may be specially colored or otherwise treated to contrast with the poultry keel, and color detection sensors and/or other sensors may be used in order to determine the relative position of the fowl carcass and keel relative to the cone, and to adjust the position of the system relative to that position. For example, in an exemplary embodiment the keel may be white or off-white, and the cones may be a contrasting darker or lighter color, for example blue, black, red, etc. The contrast may vivid enough to allow the camera to easily identify the keel position. In another embodiment the cones may be treated with a luminescent paint or coating in order to create contrast for a sensor to detect. In yet another embodiment different patterns may be used to create contrast.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for removal of a poultry keel, comprising:
   a trap module comprising;
      an assembly roof;
      an assembly wall that extends downwards from the assembly roof; and
      a trap door, which is attached to the assembly roof and extends downwards parallel to the assembly wall;
   a blade module comprising;
      a blade mount;
      one or more blades attached to the blade mount; and
   one or more movement systems, wherein the trap module and the blade module are each attached to one of the one or more movement systems and are configured to align and move horizontally along the one or more movement systems.

2. The system for removal of the poultry keel of claim 1, wherein the assembly wall contains a blade slot indentation that can accommodate at least one of the one or more blades being slid into the blade slot indentation,
   wherein the indentation is in the side of the assembly wall facing the trap door.

3. The system for removal of the poultry keel of claim 1, wherein the trap door is attached to the assembly roof via a hinge and is freely movable.

4. The system for removal of the poultry keel of claim 1, wherein the trap door is attached to the assembly roof via a pivot or hinge and is freely movable in the direction of the assembly wall and can move in the other direction via a spring, actuator, counterbalanced weight or motor.

5. The system for removal of the poultry keel of claim 4, wherein the trap door can rest against the assembly roof and the assembly roof is configured to prevent the trap door from moving freely.

6. The system for removal of the poultry keel of claim 1, wherein the one or more blades attached to the vertical blade mount include a horizontal blade attached horizontally to the bottom of the vertical blade mount and smaller blade that is attached vertically or near vertically to the vertical blade mount above the horizontal blade.

7. The system for removal of the poultry keel of claim 1, wherein the movement system is a track or rail system.

8. The system for removal of the poultry keel of claim 1, further comprising one or more sensors or cameras that can detect the position of a poultry carcass, wherein
   the position or orientation of the trap module and the blade module are adjusted based on the detected position of the poultry carcass.

9. The system for removal of the poultry keel of claim 8, wherein
   the poultry carcass is on a cone that moves the poultry carcass, and
   the cone contrasts with the poultry keel.

10. A method for removing a poultry keel, comprising:
    extending a trap module along a first movement system with at least a trap door and an assembly wall to a poultry carcass with a keel so that the trap door rides over the keel until the assembly wall bumps the keel;
    extending a blade assembly along a second movement system with at least one blade until one or more of the at least one blade slices the keel;
    retracting the trap module along the first movement system; and retracting the blade assembly along the second movement system.

11. The method for removing the poultry keel of claim 10, further comprising:
before extending the trap module detecting the position of a poultry carcass using one or more sensors or cameras, and
adjusting the position or orientation of the trap module and the blade module based on the detected position of the poultry carcass.

12. The method for removing the poultry keel of claim 10, wherein;
the poultry carcass is on a cone that can move the poultry carcass, and
the cone contrasts with the poultry keel.

13. The method for removing the poultry keel of claim 10, wherein;
the color of the cone contrasts with the color of the poultry keel, and
the one or more sensors or cameras that detect the position of the poultry carcass are color sensing sensors or cameras.

14. The method for removing the poultry keel of claim 10, wherein the trap module and blade module are each connected to a step motor that controls the extension and retraction of the trap module and blade module.

15. A system for removal of a poultry keel, comprising;
a side blade;
a gripper blade assembly head comprising;
a notch blade attached to a first side of the assembly head;
gripper jaws attached to the bottom of the assembly head, wherein the gripper jaws are configured to grip a poultry keel and are connected to an actuator or motor that controls the opening and closing of the jaws; wherein
the assembly head is configured to rotate or sideshift.

16. The system for removal of the poultry keel of claim 15, wherein the side blade is attached to the second side of the gripper blade assembly head and extends out past the first side of the assembly head wherein the second side is perpendicular to the first side.

17. The system for removal of the poultry keel of claim 15, wherein the side blade is attached to a mount separate from the gripper blade assembly head.

18. The system for removal of the poultry keel of claim 15, further comprising a linear rotary actuator, wherein the assembly head is connected to the linear rotary actuator.

19. The system for removal of the poultry keel of claim 15, wherein the edges of the jaws are offset, and the middle section of the jaws is wider that the end of the jaws.

20. The system for removal of the poultry keel of claim 15, further comprising one or more sensors or cameras that can detect the position of a poultry carcass, wherein
the position or orientation of the trap module and the blade module are adjusted based on the detected position of the poultry carcass,
the poultry carcass is on a cone that can move the poultry carcass, and
the cone contrasts with the poultry keel.

* * * * *